Nov. 3, 1959     M. H. BROCKMAN ET AL     2,911,526
SERVO SYSTEM
Filed May 10, 1954
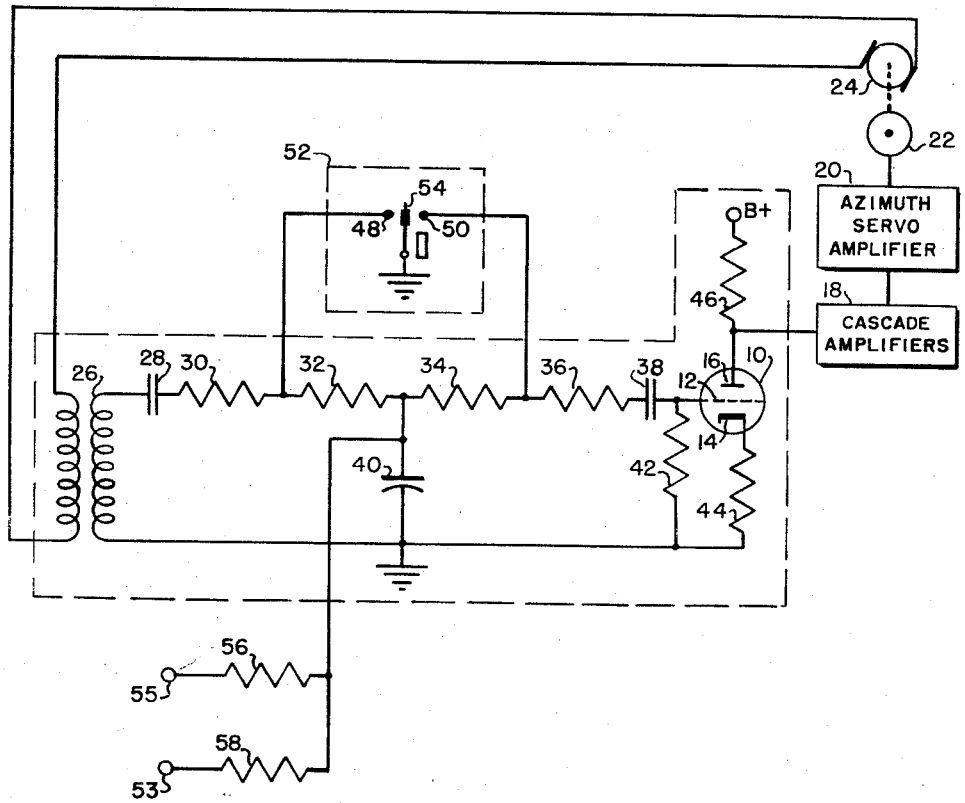
INVENTORS,
MILTON H. BROCKMAN,
BY    LAWRENCE TORN
*Harry M. Saragovitz*
ATTORNEY

United States Patent Office 2,911,526
Patented Nov. 3, 1959

2,911,526

SERVO SYSTEM

Milton H. Brockman, Williston Park, and Lawrence Torn, Seaford, N.Y., assignors to the United States of America as represented by the Secretary of the Army Application May 10, 1954, Serial No. 428,858

9 Claims. (Cl. 250—27)

This invention relates to a servo system and more particularly to a circuit in which position error and velocity information are applied as direct-current voltages to a servo system utilizing an alternating-current carrier frequency.

Because of their simplicity, reliability, absence of commutator sparking, and response, alternating-current motors are extensively used in servo applications. In track-while-scan systems it is often essential to correct the predicted azimuth of the target to its observed azimuth immediately after each scan. In such systems the position error, which is the difference between the servo input and output, and velocity information are usually generated in the direct-current form. It is often desirable in such systems to introduce the position error at periodic intervals so that one system may be used for both velocity information and position error at the end of each search scan. It therefore becomes necessary to produce a change in the shaft output position of an alternating-current servo system which is very accurately related to these direct-current voltage inputs.

It is therefore an object of this invention to provide a circuit wherein direct-current voltages are applied to operate an alternating-current servo system.

It is another object of this invention to provide a circuit wherein direct-current voltage analogues of position error and velocity information are applied with a high degree of accuracy to an alternating-current servo system.

In accordance with the present invention there is provided a circuit for use in a servo system wherein an alternating-current voltage output circuit is controlled by a direct-current input voltage. The circuit includes means for integrating the direct-current input voltage and also means in circuit with the integrating means for converting the integrated direct-current voltage to an alternating-current signal voltage having a predetermined frequency and an amplitude equal to the integrated direct-current voltage. Also included are means responsive to the converted alternating-current signal voltage for generating in the output circuit an alternating-current voltage proportional to said amplitude, and means for rectifying the alternating-current output circuit voltage. Means are also provided for applying the rectified voltage to the integrating means in proper phase to cancel the integrated direct-current voltage.

For a better understanding of the present invention, together with other and further objects thereof, reference is had to the following description taken in connection with the accompanying drawing and its scope will be pointed out in the appended claims.

In the drawing, there is shown a schematic circuit diagram indicating in detail one embodiment of the invention.

Referring now to the drawing, there is shown at 10 an integrating amplifier having a grid 12, a cathode 14, and a plate 16. Integrating amplifier 10 may be the first stage of an alternating-current servo system which includes a series of cascaded amplifiers 18, the output of which is applied to an azimuth servo amplifier 20. The output of azimuth servo amplifier 20 drives an alternating current motor 22 which, in turn, through suitable gearing, drives an azimuth shaft and also produces a 60-cycle rate voltage in a tachometer 24. The azimuth servo amplifier 20, motor 22 and tachometer 24 are well known in the art and no detailed circuitry thereof is believed necessary.

The alternating-current output of tachometer 24 is applied across the terminals of the primary winding of transformer 26. One terminal of the secondary winding of transformer 26 is coupled to grid 12 through the series arrangement of capacitor 28, resistors 30, 32, 34, 36 and capacitor 38 and the other terminal of the secondary winding is connected to ground. Connected between the junction of resistors 32 and 34 and ground there is provided an integrating capacitor 40. Grid 12 and cathode 14 of integrating amplifier 10 are connected to ground through respective grid and cathode resistors 42 and 44. Plate 16 of integrating amplifier 10 is connected to B+ through plate load resistor 46.

Connected across the junction of resistors 30 and 32 and the junction of resistors 34 and 36 are the output terminals 48 and 50 of a chopper 52 having its vibratory arm 54 grounded as shown. Any suitable 60-c.p.s. source, not shown, may be provided for energizing vibratory arm 54 of chopper 52. The direct-current voltage inputs are applied to integrating capacitor 40 through input terminal 53 and resistor 58, and through input terminal 55 and resistor 56, each of said resistors having relatively high ohmic values. As will be explained hereinbelow, the velocity information may be applied to terminal 53 and the periodic position error information to terminal 55.

In operation, it is to be assumed that after each search scan the predicted azimuth of the target and the observed azimuth of the target do not coincide so that a correction is necessary immediately after each search scan. Moreover, it is to be assumed that there is applied at input terminal 53 a direct-current voltage of constant amplitude proportional to the angular azimuth velocity. Clockwise velocity may be considered positive angular velocity and counterclockwise velocity may be considered to be negative angular velocity. This direct-current voltage is of constant amplitude during each scan for about four seconds. Resistor 58 and capacitor 40 comprise an integrating circuit to produce the integral of the direct-current input voltage across capacitor 40. The resultant integrated voltage developed across capacitor 40 is converted to a 60-c.p.s. square wave voltage by chopper 52. This square wave is coupled to grid 12 through coupling capacitor 38 every time vibrator arm 54 makes contact with chopper output terminal 48 and is then amplified. The amplified square wave is applied to azimuth servo amplifier 20 through a series of cascaded amplifiers 18 to produce rotation of the shaft of motor 22 which in turn produces a 60-c.p.s. output voltage from tachometer 24 which is fed back to the input of integrating amplifier 10 through the primary and secondary windings of transformer 26. The tachometer output voltage is rectified by chopper 52 when vibrator arm 54 contacts output chopper terminal 50 and this rectified voltage is also integrated in capacitor 40 through resistors 30 and 32 and is of such a polarity that it substantially cancels the integrated voltage applied to capacitor 40 due to the charging current through resistor 58. Under the conditions hereinabove described, the output shaft of motor 22 rotates at just the rate necessary to maintain the voltage across capacitor 40 at practically zero.

Periodically, at the end of each search scan, it is required to correct the predicted azimuth of the target to its observed azimuth. There is applied to terminal 55 a rectangular gate voltage, hereinafter referred to as the position gate voltage, which is of relatively short duration compared to the duration of the direct-current voltage applied to input terminal 53. The amplitude of the position gate voltage is made proportional to the error voltage which is the difference between the predicted azimuth of the target and its observed azimuth. This error voltage may be considered to be positive if the predicted azimuth is counterclockwise from, and negative if the predicted azimuth is clockwise from the observed azimuth target. The position gate voltage is applied to integrating capacitor 40 through resistor 56. The time constant of resistance 56 and capacitor 40 is made very much greater than the width of the position error gate applied to input terminal 55 so that the voltage developed across capacitor 40 after this period is a very accurate measure of the amplitude of the position gate voltage. The direct-current voltage thus developed across capacitor 40 is converted to a 60-c.p.s. square wave in chopper 52 by means of vibrator 54 and terminal 48. This square wave is applied to servo azimuth amplifier 20, the output of which drives the shaft of motor 22 in accordance with the amplitude of the position gate voltage. The rotation of the shaft of motor 22 will produce an alternating current 60-cycle voltage output from tachometer 24 which is fed back to the input of integrating amplifier 10 through the primary and secondary windings of transformer 26. This alternating-current feedback voltage is then rectified by means of vibrator 54 and terminal 50 of chopper 52 as hereinabove described and integrated in capacitor 40 to produce a voltage thereon having a polarity opposite to that placed on the capacitor by the integration of the position gate voltage through resistor 56. Rotation of the shaft of motor 22 continues until the integrated rectified alternating-current voltage from tachometer 24 cancels the voltage stored in capacitor 40 by the position gate voltage. The corrected velocity is then applied to terminal 53 and the process is then repeated for each search scan.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a servo system wherein an alternating-current voltage output is controlled by a direct-current input voltage, means for integrating the direct-current input voltage, means in circuit with said integrating means for converting the integrated direct-current voltage to an alternating-current signal voltage having a predetermined frequency and an amplitude equal to said integrated voltage, means responsive to said converted alternating-current signal voltage for generating a second alternating-current voltage proportional to said amplitude, means for rectifying the second alternating-current voltage, and means for applying said rectified voltage to said integrating means in proper polarity to cancel the integrated direct-current voltage.

2. In a servo system wherein an alternating-current output voltage is controlled by a direct-current input voltage, an amplifier having at least a plate, cathode, and grid, means in circuit with said grid for integrating the direct-current input voltage, means in circuit with said integrating means and said grid for converting the integrated direct-current voltage to an alternating-current signal voltage having a predetermined frequency and an amplitude equal to said integrated voltage, said alternating current signal voltage being amplified in the plate cathode circuit of said amplifier, means responsive to the amplified alternating-current signal voltage for generating a second alternating-current voltage proportional to said amplitude, means for rectifying the second alternating-current voltage, and means for applying said rectified voltage to said integrating means whereby the integrated rectified voltage cancels the integrated direct-current voltage.

3. In a servo system wherein an alternating-current output voltage is controlled by a direct-current input voltage, an amplifier having at least a grid, a cathode and a plate, means for coupling said output voltage to said grid, at least two resistors in series between said coupling means and said grid, means connected to the junction of said resistors for integrating said direct-current input voltage, a first means connected across the end terminals of said resistors for converting said integrated direct-current voltage to an alternating current signal voltage having a predetermined frequency, means in circuit with said plate and responsive to said alternating current voltage for generating a second alternating-current signal voltage at said frequency, and a second means connected across said end terminals for simultaneously rectifying the second alternating-current voltage and applying said rectified voltage to said integrating means to cancel the integrated direct-current voltage.

4. In a servo system wherein an alternating-current output voltage is controlled by a direct-current input voltage, an amplifier having at least a grid, a cathode, and a plate, means for coupling said output circuit voltage to said grid, said means comprising a transformer having a primary and secondary winding, at least two resistors connected in series with said secondary winding and said grid, means connected to the junction of said resistors for integrating said direct-current input voltage, a chopper adapted to operate at a predetermined frequency and having a vibrating arm and at least two output terminals, said terminals being connected across the ends of the series connected resistors, said chopper converting said direct-current integrated voltage to an alternating-current signal voltage when said arm contacts one of said terminals, means connected across said primary winding and in circuit with said plate responsive to said alternating-current voltage for generating a second alternating-current signal voltage, said chopper rectifying the second alternating-current output voltage when said arm is in contact with the other of said terminals, said rectified voltage being in opposite polarity to said integrated direct-current voltage, and means for combining said rectified voltage with said integrated direct-current voltage in said integrating means to control the alternating-current output voltage.

5. The servo system in accordance with claim 4, wherein said alternating-current signal voltage is a square wave.

6. In a servo system wherein an alternating-current output voltage is controlled by a direct-current input voltage, means for integrating the direct-current input voltage, an amplifier having at least a grid, a plate and a cathode, means in circuit with said grid for converting the integrated direct-current voltage to an alternating-current signal voltage having a prescribed frequency and an amplitude equal to said integrated voltage, means in circuit with said plate and responsive to said alternating-current signal voltage whereby there is produced a second alternating-current voltage having said prescribed frequency and proportional to said amplitude, means for coupling said second alternating-current voltage to said grid, and means in circuit with said coupling means for simultaneously rectifying said second alternating-current voltage and applying said rectified voltage to said integrating means in proper polarity to cancel the integrated direct-current voltage.

7. In a servo system wherein an alternating-current output voltage is controlled by a direct-current input voltage, an amplifier having at least a grid, a plate and a cathode, a transformer having primary and secondary windings, means in circuit with the secondary winding of said transformer and said grid for integrating the direct-current input voltage, means in circuit with said grid for converting the integrated direct-current voltage to an alternating-current signal voltage having a prescribed frequency and an amplitude equal to the integrated voltage, means in circuit with said plate and responsive to said alternating-current signal voltage whereby there is produced a second alternating-current voltage having said prescribed frequency and proportional to said amplitude, said primary winding being connected across said second alternating-current voltage producing means, and means in circuit with said secondary winding for simultaneously rectifying said second alternating-current voltage and applying said rectified voltage to said integrating means in proper polarity to cancel the integrated direct-current voltage.

8. The system in accordance with claim 3 wherein said first means and said second means comprise a chopper having at least two output terminals connected across the ends of the series connected resistors and a vibrating arm driven in synchronism with said predetermined frequency, said chopper converting said direct-current integrated voltage to the alternating-current signal voltage when said arm contacts one of said output terminals, and simultaneously rectifying the second alternating-current voltage and applying the rectified voltage to the integrating means when said arm is in contact with the other of said output terminals.

9. A servo system comprising, a source of direct-current voltage, an amplifier having at least a plate, a cathode and a grid, a transformer having primary and secondary windings, a series connection comprising a first capacitor, at least two resistors, and a second capacitor connected between one terminal of said primary winding and said grid, the other terminal of said primary winding being grounded, an integrating capacitor connected between the junction of said resistor and ground and responsive to said direct-current voltage, an alternating-current tachometer in circuit with said plate and having its output connected across said secondary winding, the output of said tachometer having a prescribed frequency, a chopper having at least two output terminals connected across the ends of the series connected resistors and having a vibrating arm connected at one end to ground and driven in synchronism with the output frequency of said alternating-current tachometer, said chopper converting the direct-current integrated voltage developed across said capacitor to an alternating-current signal voltage of said prescribed frequency when said arm contacts one of said terminals, and simultaneously rectifying the tachometer output voltage and applying said rectified voltage to the integrating capacitor when said arm is in contact with the other of said terminals, said rectified voltage being of opposite polarity to the integrated direct-current voltage.

References Cited in the file of this patent

UNITED STATES PATENTS

| | | |
|---|---|---|
| 2,551,964 | Norton | May 8, 1951 |
| 2,622,231 | Gray | Dec. 16, 1952 |
| 2,632,142 | Chenery | Mar. 17, 1953 |
| 2,668,264 | Williams | Feb. 2, 1954 |
| 2,671,610 | Sweer | Mar. 9, 1954 |
| 2,713,135 | Macklem | July 12, 1955 |
| 2,744,227 | Spindler | May 1, 1956 |